Patented Dec. 11, 1951

2,578,259

UNITED STATES PATENT OFFICE 2,578,259

COPOLYMERIZATION PROCESS AND PRODUCT

Edward B. McMillan, Wakefield, Mass., assignor, by mesne assignments, to the United States of America as represented by the Secretary of the Navy No Drawing. Application March 5, 1946, Serial No. 652,236

3 Claims. (Cl. 260—78.5)

This invention relates to a plastic resin and more specifically to the copolymer of dichlorostyrene and a polybasic acid.

Many resins of the polyester copolymer type are presently in use as laminating resins. In general, these resins are very weak mechanically and therefore, are usually used only with fillers or as binders in laminated products. The strength of the product depends upon the filler or lamination material used and the binding action of the resin. The resins are subject to crazing, that is, minute cracks in the resin caused by repeated expansion and contraction due to temperature cycling. Thus, with aging, the resin will weaken and greatly reduce the strength of the product. The resistance of the resins to heat is also poor.

The object of this invention is to provide a laminating resin having improved mechanical properties.

Another object is to provide a resin of the polyester copolymer type having sufficient mechanical strength for cast products.

A further object is to provide a resin being the copolymer of a halogenated styrene and an unsaturated polybasic acid.

A still further object is to provide a resin formed by the copolymerization of 2,5-dichlorostyrene and maleic anhydride.

These and other objects will be evident from the following specifications:

A resin has been prepared by copolymerizing maleic anhydride and 2,5-dichlorostyrene. Maleic anhydride, a solid substance, was dissolved in 2,5-dichlorostyrene which is a liquid. The proportions used were: 50 to 60% by weight of maleic anhydride and 40 to 60% by weight of 2,5-dichlorostyrene. A catalyst, lauryl peroxide, was added in percentages ranging from one half to two percent. The mixture was then cast in a mold, subjected to a pressure of 33 lbs./sq. in., and polymerized by the application of heat at 115° C. for a period of 40 minutes followed by heating to 140° for 30 minutes. The resulting product was free from cracks and crazing and had good mechanical strength.

The copolymer produced has the molecular formula $(C_4H_2O_3—C_8H_6Cl_2)_n$, and the structural formula:

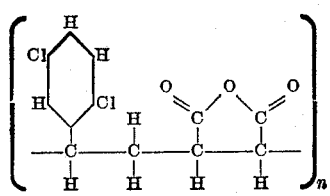

Many variations of the composition and procedure are possible. Maleic anhydride is a form of an unsaturated polybasic acid and other unsaturated polybasic acids may be used in its place. The anhydride form was used only to eliminate the undesirable water which would be present if the acid form were used. Any halogenated styrene could be used instead of the 2,5-dichlorostyrene. The catalytic action may be obtained by any organic peroxide not necessarily the lauryl peroxide used. Many other ingredients in minor proportions may be included in the preparation to obtain certain special properties. The resin may be cast, molded, or used as a binder in laminated products. Polymerization may be accomplished by heating to a temperature of 80° C. to 90° C. for 15 minutes followed by heating to temperatures ranging from 105° C. to 120° C. for corresponding periods of time of from one and a half hours to forty minutes. Pressure applied during polymerization is necessary only to maintain the shape of the desired product.

The resin prepared as stated above is craze free and therefore much stronger mechanically than other resins of this type. This property also makes the laminated product produced with this resin much stronger and greatly improves its resistance to aging and temperature cycling. The resistance to heat is improved and the electrical properties of the resin are very good.

The invention is not to be limited by the particular composition and process described, except as appears hereafter in the claims.

What is claimed is:

1. As a new composition of matter, a plastic resin formed by the copolymerization of substantially equal amounts by weight of maleic anhydride and 2,5-dichlorostyrene in the presence of a peroxide catalyst at an initial temperature of 80–90° C. for 15 minutes followed by holding at a temperature of 105–120° C. from 30 to 40 minutes.

2. The process of preparing a plastic resin which consists of dissolving in a given quantity of 2,5-dichlorostyrene a substantially equal weight of maleic anhydride, adding from ½ to 2% by weight of a peroxide catalyst, and subjecting the solution to a temperature range of 80–90° C. for 15 minutes followed by holding at a temperature range of 105–120° C. for 30 to 40 minutes whereby the final copolymerization product of the reacting substances is formed.

3. As a new composition of matter, a plastic resin formed by the copolymerization of substantially equal amounts by weight of maleic anhydride and 2,5-dichlorostyrene in the presence of ½ to 2% of a peroxide catalyst at an initial temperature of 80–90° C. for 15 minutes followed by holding at a temperature of 105–120° C. for 30 to 40 minutes, said resin having the formula:

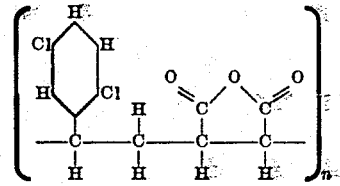

where $n$ is an integer.

EDWARD B. McMILLAN.

REFERENCES CITED

The following references are of record in the file of this patent:

UNITED STATES PATENTS

| Number | Name | Date |
|---|---|---|
| 2,047,398 | Voss et al. | July 14, 1936 |
| 2,390,437 | Hayes | Dec. 4, 1945 |
| 2,406,319 | Brooks et al. | Aug. 27, 1946 |
| 2,430,313 | Vana | Nov. 4, 1947 |

OTHER REFERENCES

Michalek and Clark: Chemical & Eng. News, vol. 22, No. 18, September 25, 1944, pp. 1559–63.